United States Patent [19]
Nelson

[11] Patent Number: 5,627,133
[45] Date of Patent: May 6, 1997

[54] ENVIRONMENTALLY BENEFICIAL SOIL AMENDMENT

[75] Inventor: Sidney G. Nelson, Hudson, Ohio

[73] Assignee: Sorbent Technologies Corporation, Twinsburg, Ohio

[21] Appl. No.: 658,963

[22] Filed: May 31, 1996

[51] Int. Cl.$^6$ .................................................. A01N 25/00
[52] U.S. Cl. ................... 504/116; 71/25; 71/903
[58] Field of Search .................. 504/116; 71/25, 71/903

[56] References Cited

U.S. PATENT DOCUMENTS

| | | | |
|---|---|---|---|
| 5,380,351 | 1/1995 | Fisher | 75/313 |
| 5,486,342 | 1/1996 | Moser et al. | 423/243.01 |

*Primary Examiner*—Jose'G. Dees
*Assistant Examiner*—Brian G. Bembenick

[57] ABSTRACT

A soil amendment for reclaiming mine spoils and for enriching agricultural, horticultural, and turf grass soils while reducing the release of heavy metals into the environment comprising a liming agent, expanded vermiculite or perlite particles, fly ash, and a reaction product generated by exposing a calcium compound in a duct-injection process to a combustion flue-gas stream containing sulfur dioxide.

3 Claims, No Drawings

ENVIRONMENTALLY BENEFICIAL SOIL AMENDMENT

BACKGROUND OF INVENTION

1. Field of the Invention

This invention relates to a soil amendment, and more particularly, to a soil amendment made from waste products that is useful for reclaiming mine spoils and for enriching agricultural, horticultural, and turf grass soils without releasing undesirable levels of heavy metals into the environment.

2. Description of the Prior Art

The combustion of coal at conventional power plants results in a variety of residues that require disposal, including bottom ash, fly ash, and flue-gas desulfurization waste. Bottom ash is the residue from coal combustion that remains in the boiler. It consists of both fine- and coarse-grained materials and is generally a combination of ash and slag. Fly ash is the residue from coal combustion that passes out from the boiler with the flue-gas stream. It is composed predominantly of fine particles having a high clay content and some free carbon. Fly ash particles are either collected in emission-control devices, such as electrostatic precipitators, baghouses, or mechanical collectors, or are released from the stack. Flue gas desulfurization (FGD) wastes contain sulfur oxides captured from the flue gas, as well as calcium or sodium sorbent materials that react with the sulfur oxides. FGD wastes are collected from a wet scrubber or from particulate control units located downstream from the boiler.

Raw bottom ash, fly ash and FGD wastes are commonly disposed of in landfills or ponds in the U.S. When these materials are deposited in large amounts on vegetated surfaces, the vegetation there tends to die, and revegetation is difficult.

Disposing of coal combustion residues, particularly FGD waste, is increasingly a problem. Millions of tons of FGD waste are landfilled or ponded each year. The nature of this waste varies with the desulfurization process used. The most common FGD waste is scrubber sludge. Scrubber sludge is produced from slurries of water and lime or limestone that are mixed with the flue gas stream in large vessels called wet scrubbers. The resulting waste sludge is a semi-solid material composed of ash, water, and compounds of calcium, magnesium, and sulfur. With added processing, it may be dried or oxidized to a more disposable form. Another common FGD waste is spray dryer waste. Spray dryer waste is produced from water and lime slurries that are mixed with the flue gas stream in large vessels called spray dryers. The discharge in this case is a dry powder product having a composition similar to that of a wet scrubber sludge, but without the high water content. Still another FGD waste is duct or furnace injection waste. Injection waste is produced when dry lime compounds are injected directly into the furnace or into flue-gas ductwork or downstream equipment, and then removed from the flue gas stream before the gas enters the stack. Conventional furnace and duct injection waste is dry, very fine, and tends to contain large amounts of unreacted lime. Waste from more advanced duct injection processes may be coarser in size, particularly if the process employed is that of Holter et al (U.S. Pat. No. 4,061,476) or that of the Inventor (U.S. Pat. No. 4,786,484).

Alkali oxides with vermiculite or perlite are employed in several FGD processes. These include processes by Wilson (U.S. Pat. No. 3,882,221), by Holter et al (U.S. Pat. Nos. 4,061,476 and 4,201,751), and by the Inventor (U.S. Pat. Nos. 4,721,582 and 4,786,484). Wilson describes the use of sodium or potassium alkali. Holter et al teaches the use of several materials as sorption agents, with the preferred embodiment being iron oxide, and describes a typical duct-injection process. The Inventor teaches the use of divalent metal oxides or hydroxides, with the preferred oxide being magnesium oxide that can be injected into a gas stream. In all processes, no recognition is given to the possibility of using the waste FGD materials as useful products, and no mention is made of soil amendments. In fact, concerns about disposing of the waste FGD materials led each inventor to propose the thermal or chemical decomposition or regeneration of the waste materials to make the wastes more environmentally acceptable. It should be noted that the use of FGD wastes from processes based on such oxides as sodium, potassium, and magnesium, moreover, are probably not appropriate for soil amendments, owing to their high solubilities in water.

When coal is mined, large amounts of mining wastes, commonly called spoils, are produced. These spoils are objectionable because they are unsightly, they support little or no vegetation, and they often lead to run off of highly acidic wastewater streams. Spoils are a particular problem at surface coal mines where many square miles of once pristine forests and meadowland become lifeless wastes. In many locations, surface strip mines that were abandoned 40 to 60 years ago remain barren. A need exists to revegetate these areas and to bring the ecosystem back into balance.

Fly ash has been examined in the past as an amendment to acidic surface mine spoils and mine wastes. Fly ash has been shown to be effective in increasing spoil pH, allowing the establishment of permanent vegetative cover on previously barren sites. However, because of the high acidity of the spoils, very high ash addition rates have been usually required and these, in turn, have often caused an increase in the soluble salt concentrations in the spoils. The principal concerns in the use of fly ash have been groundwater contamination from leachates and the distribution of trace elements found in the ash.

The environmental impacts associated with the disposal of scrubber sludge are similar in many ways to those associated with fly ash. In fact, fly ash is often a component of scrubber sludge, and the two wastes are commonly placed in the same disposal basin. Scrubber sludges are characterized by high pH, low levels of nitrogen and phosphorus, high soluble salt contents, and higher than normal concentrations of trace elements. As with fly ash, concerns with scrubber sludge center on possible groundwater contamination and elevated concentrations of trace elements, such as boron or selenium. An added concern with many scrubber sludges is the presence of high concentrations of sulfite. With anoxic conditions, $H_2S$ gas can be produced. With aerobic conditions, high levels of sulfite can significantly increase the oxygen demand, owing to the oxidation of sulfite to sulfate, in surface and ground waters affected by these wastes.

Past efforts have centered on developing improved procedures for disposing of coal combustion residues in an environmentally acceptable manner. The nature of the residues, for example, the dusty nature of fly ash and the strongly alkaline nature of lime wastes, has often made simple land use undesirable. Approaches to make land-fill and road-base usage acceptable have been proposed by Webster in U.S. Pat. Nos. 4,028,130 and 4,354,876, by Burns and Gremminger in U.S. Pat. No. 5,277,826, and by others. In U.S. Pat. No. 4,028,130, Webster teaches the addition of digested sewage sludge to coal combustion residues to produce a curable material suitable for land-fill usage. Burns and Gremminger propose a similar process involving sewage sludge. In U.S. Pat. No. 4,354,876, Webster describes a process for handling dry scrubber wastes. In this process, water is mixed with dry fly ash-containing scrubber wastes and the water-waste combination is compacted at the land-fill site.

Many new soil amendment products have been proposed. However, only a few involve the usage of coal combustion residues as a component of a soil amendment. Most noteworthy of these is a process described by Rehbein and Montain in U.S. Pat. No. 5,468,277, wherein a powder product comprised of fly ash and desulfurization residue from a spray dryer is added to agricultural soils. Rehbein and Montain make no special additions to their powdery soil amendment. The soil amendment of the present invention differs from Rehbein and Montain's invention in several important aspects. First, the soil amendment of my invention contains individual expanded vermiculite and/or perlite particles. The expanded vermiculite or perlite particles are important because they provide a structural support and retention means for the other components in the amendment and for moisture, they aerate the soils, and they possess electrolyte properties important to the soil environment. Second, my amendments are not powders, but are, instead, individual particles or are pellets prepared from these individual particles. Third, my amendments do not require any special application procedures. Commercial application equipment can be employed. Fourth, unlike Rehbein and Montain's invention, in which the amendments contain water at a weight ratio of 10:8 to 20 to form a slurry, my amendments do not contain added water and are employed essentially dry.

Another example of a soil amendment made from coal combustion residues is taught by Higa (U.S. Pat. No. 4,985,060). Higa describes a beneficial soil amendment consisting of coal ash and slag, to which 5 to 20 wt % zeolite is added, as well as optional microorganisms and a binder component. The Higa soil amendment, however, does not include FGD waste. Also, by not including FGD materials, the ability of the amendment to neutralize acidic soils is limited and larger amounts must be used for equivalent liming levels. Unlike the current invention, where the vermiculite or perlite are wastes from the FGD process, the zeolites in the Higa amendments must be purchased specifically for that purpose.

OBJECTS OF THE INVENTION

An object of the invention is to propose a soil amendment comprised mostly of FGD waste materials that, when mixed with soils that normally will not support vegetation, will result in healthy plant growth.

A further object of the invention is to propose a soil amendment comprised mostly of FGD waste materials that, when mixed with typical agricultural, horticultural and turf grass soils, will result in increased crop yields.

A further object of the invention is to propose a soil amendment that utilizes the large tonnages of FGD and fly ash wastes that otherwise would go to waste-disposal facilities.

DETAILED DESCRIPTION AND PREFERRED EMBODIMENT

The invention is a soil amendment comprising a mixture of vermiculite or perlite, liming agents, calcium-sulfur-oxygen compounds, and fly ash. All or most of these components are gathered from the waste streams of an air pollution control system. The vermiculite or perlite is in expanded form and makes up 10 to 40 percent by weight of the mixture. The liming agents are calcium oxide, calcium hydroxide, calcium carbonate, or mixtures thereof, and preferably are in the form of a combination of partially utilized hydrated lime and calcium carbonate and make up from 10 to 50 weight percent of the mixture. The calcium-sulfur-oxygen compounds make up from 10 to 40 weight percent of the mixture. The fly ash is less than 28 mesh in size and makes up from 10 to 50 percent by weight of the mixture. The relative composition of the soil amendment depends on the nature of the flue gas and on the mode of operation of the air pollution control system from which the materials are recovered, as well as the targeted use of the amendment. While the invention is particularly appropriate for the wastes streams of coal combustion, it is applicable to any process with sulfur-dioxide-containing flue gases.

Preferably, the materials are a result of the injection into a flue gas stream of a granular, free-flowing sorbent composed primarily of expanded vermiculite or perlite, hydrated lime, and moisture. When mixed with a gas stream containing sulfur dioxide and carbon dioxide, a portion of the hydrated lime is converted to calcium-sulfur-oxygen compounds and a portion to calcium carbonate. Most moisture in the sorbent evaporates. The sorbent materials after exposure to $SO_2$ in the flue gas stream are then collected by a suitable particulate-control device, after which they can be removed from the system or can be optionally remoistened and reinjected for additional sulfur dioxide capture. Mixing the hydrated lime with the granular vermiculite or perlite before injection causes the very fine lime to become imbedded into the much larger mineral supports. The added moisture helps the lime to adhere to the larger supports. The masses of resulting composite particles are two to three orders of magnitude larger than the masses of individual hydrated lime particles and, as a consequence, are much easier to remove from the gas stream than are fine lime particles alone. Both the partially utilized hydrated lime and the calcium carbonate contained in the resulting wastes are liming agents that can neutralize acidic soils. Nominal amounts of additional mineral supports, liming agents, or other materials can also be added to the recovered waste materials, if desired. Optionally, a dolomitic lime, rather than a calcitic lime, may be used.

The expanded vermiculite and perlite substrates hold water and air in their interstices. This is why they are sometimes added to artificial horticultural soils. However, in the present invention the vermiculite and perlite materials do more. By providing a structure into which the much finer liming and ash materials can imbed, these substrates significantly decrease the dustiness of the materials, making transport and application of the soil amendment much easier. Also, by spatially diluting the finer particles, they ease the cementitious nature of the wastes. When applied, the composite materials provide bulk and break up what would otherwise be dense soil regions. Additionally, the substrates provide large surface areas for the distribution and resulting chemical interactions of the amendment components with the soil. And the vermiculite surfaces can display ion-exchange properties that are important in the soil environment.

Fly ash may be incorporated into the soil amendment product mix either naturally, artificially, or not at all, depending on the desired goals. Injecting the original sorbent materials into the gas stream before fly-ash removal results in the fine fly ash being incorporated into the soil amendment composition, along with the lime. Alternatively, fly ash captured ahead of injection can be separately mixed in with the products after they are captured. Having fly ash present in the amendment is a preferred embodiment of the present invention if the soil amendments are for use on degraded soils or mine spoils. As much as 50 weight percent of the final amendment can be fly ash. If a cleaner soil amendment is desired, for example, for use on more fertile soils, then injection after separate fly-ash collection is preferred, and the fly ash can be disposed of separately.

An advantage of the soil amendment materials of the present invention is that they are already predominantly granular, composite materials when recovered. The innate fineness and dustiness of the calcium compounds and fly ash are significantly reduced, and the amendments can be applied to soils without further processing. While FGD wastes and fly ash are usually troublesome to dispose of by themselves, their combination with the vermiculite and perlite will result in beneficial amendment properties. With an agglomeration step, the mixture can also be employed in the form of a prill, pellet, or extrudite with or without a binder. Such forms may have advantages in transport and application and can advantageously slow the release of the fertilizer values of the amendments. It has been also observed that nitrogen compounds, such as urea or ammonium nitrate, and other fertilizer, pesticide, or herbicide additives can be readily added to the amendment mixtures, particularly when the amendments are produced in agglomerated forms.

As the following examples demonstrate, the result of the invention is a soil amendment material made from wastes that will aid in the revegetation of waste and mine-spoil areas when used on poor soils and will provide increased crop or turf yields when used on higher-quality soils.

EXAMPLE 1

Greenhouse pot tests were performed on 1.2 kilogram samples of a degraded soil containing spoils from an abandoned strip mine. Soil amendment products composed of dry FGD wastes were then added to the pots. The FGD wastes consisted of used duct-injection sorbent materials which had been injected into and collected from a flue gas containing sulfur dioxide at a coal-fired power plant. The resulting waste materials contained expanded vermiculite or perlite, hydrated lime, fly ash, and a calcium-sulfur-oxygen reaction product. In one FGD configuration tested, the resulting materials contained practically no fly ash; materials collected during the testing of a second configuration contained the full fly ash load. The percentages by weight of vermiculite, liming agent, fly ash and calcium-sulfur-oxygen reaction product in the resulting amendments were approximately 30 to 25, 30 to 25, 0 to 20, and 40 to 30, respectively. The FGD amendments were employed in the form of both loose mixtures and extruded pellets and were added to the soils in equivalent quantities proportional to their measured lime equivalencies. For comparative purposes, two control materials were also included in this series: mine-spoils soil with no additives and mine-spoils soil with a lime addition at a liming ratio of 1.0. Two grams of rye grass seed were then planted into each pot. Each pot test was performed in triplicate, and the results were averaged.

The various pots were placed in a greenhouse under simulated field conditions in a standard experimental protocol. Table I provides the dry grass weights after ten weeks, from a fourth and final cutting, once the soils had had an opportunity to stabilize. A liming rate of 1.0 represents the alkalinity addition recommended for the soil based on its measured pH. Extremely little plant growth was seen in the no-treatment control samples. The control pots containing the commercial lime, on the other hand, exhibited moderate growth. In the pots containing the FGD amendments, both loose and in pellet form, the plant growth rates were comparable with that of the control pots containing the commercial lime. The pots containing the dry FGD wastes and fly ash, however, demonstrated plant growth far exceeding those of all the other materials. In this degraded soil, the FGD amendments with fly ash produced almost three times the growth that the commercial lime control did.

TABLE I

Greenhouse Tests with Mine Spoil Soil

| Material | Form | Liming Rate | Dry Cutting Weight* (g/pot) |
|---|---|---|---|
| Control with No Treatment | — | 0.0 | 0.02 |
| Control with Commercial Lime | — | 1.0 | 0.13 |
| Vermiculite FGD Waste | As Is | 0.5 | 0.43 |
| Vermiculite FGD Waste | As Is | 1.0 | 0.31 |
| Vermiculite FGD Waste | As Is | 2.0 | 0.48 |
| Vermiculite FGD Waste | Pellets | 0.5 | 0.44 |
| Vermiculite FGD Waste | Pellets | 1.0 | 0.44 |
| Vermiculite FGD Waste | Pellets | 2.0 | 0.41 |
| Verm. FGD Waste with Ash** | Pellets | 0.5 | 0.63 |
| Verm. FGD Waste with Ash** | Pellets | 1.0 | 1.16 |
| Verm. FGD Waste with Ash** | Pellets | 2.0 | 1.23 |

*Average for 3 pots.
**Approximately 20 wt % fly ash.

EXAMPLE 2

A similar series of greenhouse tests were performed using 1.2 kilogram samples of a slightly-acidic silt loam agricultural soil. The tested amendments had compositions similar to those listed in Example 1, and two grams of rye grass were planted into each pot. Similar controls were employed and the pot tests were again run in triplicate.

Table II provides the dry weights of the fourth and final cutting. These results showed that at similar application rates, the FGD amendments significantly out-performed the commercial lime, resulting in from 15 to 33% more plant growth. In fact, the FGD amendments performed almost as well with only half the recommended liming application rate as the commercial lime did at the full rate. The results also showed that perlite is as effective as vermiculite in the new amendments and that loose amendments performed about the same as the pelletized ones in the agricultural soil.

TABLE II

Greenhouse Tests with Agricultural Soil

| Material | Form | Liming Rate | Dry Cutting Weight* (g/pot) |
|---|---|---|---|
| Control with No Treatment | — | 0.0 | 0.37 |
| Control with Commercial Lime | — | 1.0 | 1.15 |
| Vermiculite FGD Waste | As Is | 0.5 | 1.27 |
| Vermiculite FGD Waste | As Is | 1.0 | 1.35 |
| Vermiculite FGD Waste | As Is | 2.0 | 1.56 |
| Perlite FGD Waste | As Is | 1.0 | 1.53 |
| Vermiculite FGD Waste | Pellets | 0.5 | 1.10 |
| Vermiculite FGD Waste | Pellets | 1.0 | 1.41 |
| Vermiculite FGD Waste | Pellets | 2.0 | 1.28 |
| Perlite FGD Waste | Pellets | 1.0 | 1.33 |
| Verm. FGD Waste with Ash** | Pellets | 0.5 | 1.03 |
| Verm. FGD Waste with Ash** | Pellets | 1.0 | 1.35 |
| Verm. FGD Waste with Ash** | Pellets | 2.0 | 1.61 |

*Average for 3 pots.
**Approximately 20 wt % fly ash.

EXAMPLE 3

An important feature of the soil amendment of the invention is its low leachability of heavy metals. The common leaching of toxic heavy metals from waste materials into ground waters is a vital environmental concern. Standard Toxic Characteristic Leaching Procedure (TCLP) analyses for the soil amendment materials of the invention were performed by the Ohio Agricultural Research and Development Center. The leachate data are provided in Table III. The amounts of heavy metals leached from the amendments were all well below current standards for classification as a solid waste. It can be observed from these data that the leaching of heavy metals from soils treated with the new amendment should not be a problem.

TABLE III

Metal Levels in TCLP Leachates (mg/l)

| Metal | Agric. Soil | Spoils Soil | Sample A | Sample B | Sample C | Sample D | Sample E | Sample F | Solid Waste Std. |
|---|---|---|---|---|---|---|---|---|---|
| Ag | <0.01 | <0.01 | <0.01 | <0.01 | <0.01 | <0.01 | <0.01 | <0.01 | 1.50 |
| As | <0.04 | <0.04 | 0.07 | 0.10 | 0.14 | <0.04 | 0.13 | 0.22 | 1.50 |
| B | 0.01 | 0.03 | 6.55 | 6.34 | 6.16 | 5.58 | 7.54 | 6.92 | — |
| Ba | 0.21 | 0.02 | 0.70 | 0.13 | 0.78 | 0.10 | 0.61 | 0.65 | 30.00 |
| Be | <0.001 | <0.001 | <0.001 | <0.001 | <0.001 | <0.001 | <0.001 | <0.001 | — |
| Cd | 0.003 | 0.001 | 0.004 | 0.002 | 0.005 | 0.003 | 0.004 | 0.004 | 0.300 |
| Co | 0.01 | 0.24 | 0.04 | 0.02 | 0.03 | 0.02 | 0.04 | 0.03 | — |
| Cr | 0.002 | 0.01 | 0.01 | 0.01 | 0.01 | 0.02 | 0.01 | 0.01 | 1.50 |
| Cu | 0.005 | 0.020 | 0.003 | 0.005 | 0.005 | 0.010 | 0.003 | 0.006 | — |
| Mn | 0.43 | 19.61 | 1.65 | 0.49 | 1.42 | 0.48 | 1.37 | 1.17 | — |
| Mo | 0.02 | 0.01 | 0.01 | 0.06 | 0.05 | 0.05 | 0.09 | 0.08 | — |
| Ni | 0.01 | 0.88 | 0.14 | 0.12 | 0.13 | 0.18 | 0.13 | 0.09 | — |
| Pb | <0.02 | <0.02 | <0.02 | 0.03 | <0.02 | 0.05 | 0.02 | <0.02 | 1.50 |
| Sb | <0.1 | <0.1 | <0.1 | <0.1 | <0.1 | <0.1 | <0.1 | <0.1 | — |
| Se | 0.40 | 0.48 | <0.1 | <0.1 | 0.19 | 0.16 | 0.13 | <0.1 | 0.30 |
| Sr | 0.05 | 0.03 | 2.78 | 2.66 | 2.50 | 2.42 | 2.76 | 2.57 | — |
| V | <0.005 | <0.005 | 0.09 | 0.09 | 0.08 | 0.08 | 0.09 | 0.09 | — |
| Zn | 0.05 | 0.87 | 0.01 | 0.01 | 0.01 | 0.01 | 0.02 | 0.01 | — |

Sample A - Vermiculite FGD Waste
Sample B - Perlite FGD Waste
Sample C - Vermiculite FGD Pellets
Sample D - Perlite FGD Pellets
Sample E - Small Pellets of Vermiculite FGD Waste with Ash
Sample F - Large Pellets of Vermiculite FGD Waste with Ash While various embodiments of the present invention have been described in detail, it is apparent that modifications and adaptations will occur to those skilled in the art. However, it is to be understood that such modifications and adaptations are within the scope of the present invention, as set forth in the following claims.

What is claimed is:

1. A soil amendment for reclaiming and enriching soils, comprising:

an expanded mineral support selected from the group consisting of vermiculite, perlite, and mixtures thereof, and making up from 10 to 40 percent by weight of said amendment;

a liming agent selected from the group consisting of calcium hydroxide, calcium carbonate, calcium oxide, and mixtures thereof and making up from 10 to 50 percent by weight of said amendment;

calcium-sulfur-oxygen compounds making up from 10 to 40 percent by weight of said amendment; and fly ash having a size of 28 mesh or less and making up from 0 to 50 percent by weight of said amendment;

wherein said mineral supports, liming agents, calcium-sulfur-oxygen compounds, and fly ash are essentially derived from the waste materials of a duct-injection flue gas desulfurization and particulate control process.

2. A soil amendment according to claim 1, wherein the combination is agglomerated into individual agglomerates, with each agglomerate having a volume of between 0.001 and 0.1 cubic centimeters.

3. A soil amendment according to claim 2, which further includes an additive selected from the group consisting of nitrogen fertilizer compounds, potassium compounds, phosphorus compounds, pesticides, herbicides, and mixtures thereof, said total additive amount making up less than 25 percent of said amendment by weight.

* * * * *